T. J. STURTEVANT.
APPARATUS FOR MANUFACTURING ACID PHOSPHATE OR SUPERPHOSPHATE.
APPLICATION FILED APR. 19, 1921.

1,428,920.

Patented Sept. 12, 1922.
3 SHEETS—SHEET 1.

Patented Sept. 12, 1922.

1,428,920

UNITED STATES PATENT OFFICE.

THOMAS J. STURTEVANT, OF WELLESLEY, MASSACHUSETTS, ASSIGNOR TO STURTE-VANT MILL COMPANY, OF BOSTON, MASSACHUSETTS, A CORPORATION OF MASSA-CHUSETTS.

APPARATUS FOR MANUFACTURING ACID PHOSPHATE OR SUPERPHOSPHATE.

Application filed April 19, 1921. Serial No. 462,758.

*To all whom it may concern:*

Be it known that I, THOMAS J. STURTE-VANT, a citizen of the United States, residing at Wellesley, in the county of Norfolk and State of Massachusetts, have invented an Improvement in Apparatus for Manufacturing Acid Phosphate or Superphosphate, of which the following description, in connection with the accompanying drawings, is a specification, like characters on the drawings representing like parts.

The invention to be hereinafter described, relates to apparatus for manufacturing acid phosphate or superphosphate.

Phosphate rock as it occurs in nature is unfit for use as a fertilizer on account of its insolubility. Therefore, it is necessary to treat the phosphate rock so as to convert the insoluble phosphates therein to soluble phosphates which can be applied to the soil and assimilated by plants. This is usually accomplished by mixing ground phosphate rock with an acid, such, for example, as sulphuric acid.

The mixed ground phosphate rock and dilute acid have been introduced into a den and allowed to stand therein a sufficient length of time for the chemical reaction to take place. Then it has been customary to remove the mixture and convey the same to a curing pile where it is allowed to remain a sufficient length of time for the chemical reaction to continue.

The present invention provides a simple and efficient apparatus whereby the mixture of ground phosphate rock and acid may be delivered in batches or charges to a carrier having a travel or movement sufficiently slow to allow the sludge or molten mixture to change to spongy or more or less solid form. The charges after changing to this form are delivered to a cutter or disintegrator which breaks down the charges. At the same time the materials may be aerated and the noxious fumes and moisture in the form of steam may be removed. The materials may then be delivered to a suitable conveyor which carries them to the curing pile where they are allowed to remain for a sufficient length of time for the chemical reaction to continue. Then the materials are ready for transportation and use.

The character of the invention may be best understood by reference to the following description of one good form of apparatus embodying the invention, shown in the accompanying drawings, wherein:

Fig. 1 is a vertical longitudinal section through the apparatus;

Fig. 2 on an enlarged scale is an end elevation of the apparatus;

Fig. 3 on an enlarged scale is a view partly in elevation and partly in section of the rotary carrier;

Fig. 5 is a transverse section taken on line 5—5 of Fig. 3.

Figure 1:
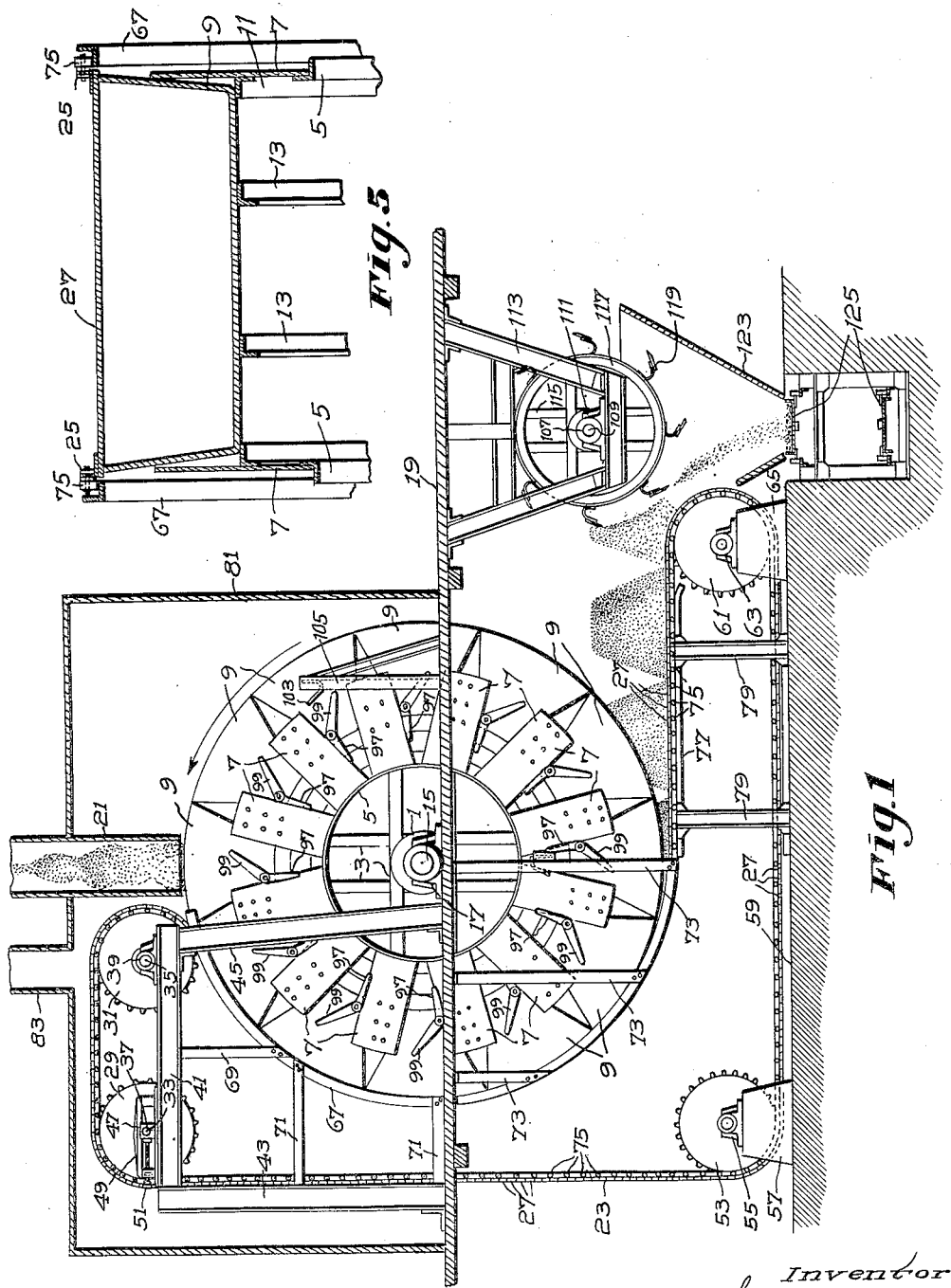
Figure 2:
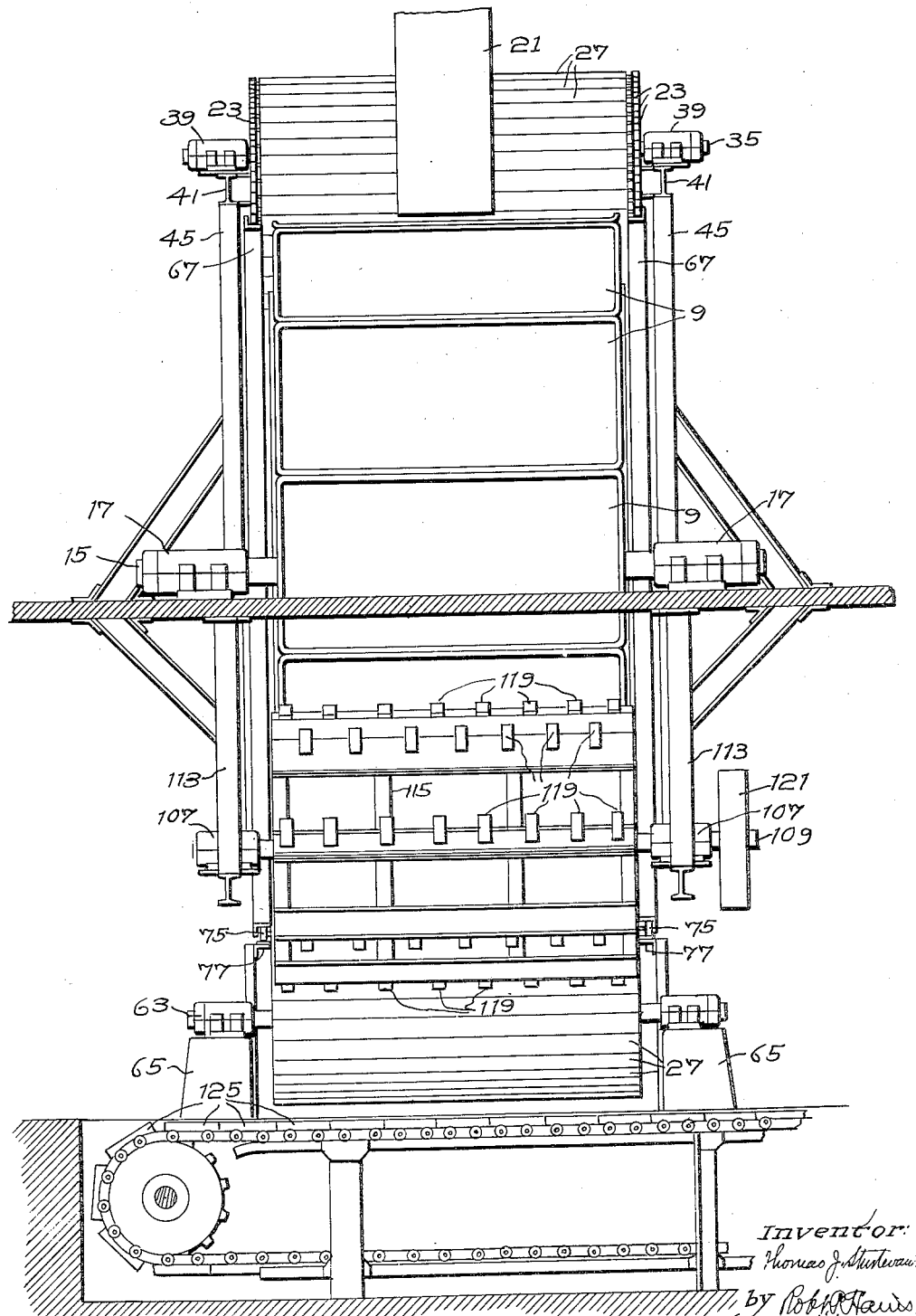

Referring to the drawings, the apparatus shown therein as one good form of the invention, comprises a rotary carrier, in the present instance, having a hub 1 having arms 3 projecting therefrom secured to side angle bar rings 5 secured to side plates 7. These plates support a series of pockets or charge receivers 9 having their bottoms resting on and secured to angle bar rings 11 attached to the side plates 7. Rings 13 similar to the rings 11 may also be provided further to stiffen the construction. The pockets, in the present instance, have open tops to receive and deliver the charges, as more fully hereinafter described.

The hub 1 of the carrier may be mounted fast on a shaft 15 journalled in bearings 17, in the present instance, mounted on a floor 19.

Suitable means may be provided to feed charges of the mixed ground phosphate rock and acid to the pockets of the rotary carrier. This means, in the present instance, is in the form of a chute 21 which may conduct the mixture from a mixing apparatus of usual well known construction, and therefore, unnecessary to disclose herein. The lower end of the chute 21 is directly above the rotary carrier, so that as the pockets slowly and progressively pass the lower end of the chute, the charges may be delivered from the chute into the pockets.

The present invention contemplates that the carrier shall be rotated at a speed appropriate to allow sufficient time for the charges to change from molten or semi-liquid condition to spongy mass or solid condition before being delivered from the pockets of the carrier.

It is desirable, therefore, to provide means for preventing escape of the charges from the pockets while the carrier is rotating, in the present instance, through an arc of substantially 180°, that is, to carry a pocket from a position in which its open top faces upward, to a position in which its open top faces downward. It is also desirable that means shall be provided to convey the successive charges delivered by the rotary carrier to the disintegrator to be described. These purposes, in the present instance of the invention, are accomplished by an endless belt 23 which may comprise a pair of sprocket chains 25 connected by slats of wood or other appropriate material, preferably closely abutting so as to provide in effect a continuous belt. The sprocket chains may be guided about upper sprocket wheels 29 and 31 having shafts 33 and 35 journalled in bearings 37 and 39 mounted on a frame 41 supported by uprights 43 and 45 rising from the floor 19. The bearings 37 may be in sliding boxes 47 mounted in guideways 49 and adapted to be adjusted by screws 51 to enable the belt to be given the tension required.

The sprocket chains are also guided by lower sprocket wheels 53 on shafts journalled in bearings 55 mounted on blocks 57 on a floor 59 beneath the floor 19 referred to. The sprocket chains may also be provided with sprocket wheels 61 on a shaft journalled in bearings 63 on blocks 65 mounted on the floor 59. One of the shafts for the sprocket wheels may be driven by an electric motor or by a pulley connected by a belt with a line shaft. Since driving devices of this character are well known, it is unnecessary to disclose the same herein.

The belt in its run from the upper sprocket wheels 31 to the lower sprocket wheels 61 may pass around and engage the open upper ends of the pockets, as will be noted in Fig. 1, and the frictional engagement between the belt and the edges of the pockets may be such that the belt may serve to rotate the pocket carrier.

Suitable means may be provided to contribute to the guidance of the portion of the belt which wraps about or engages the pocket carrier. This means, in the present instance of the invention, comprises curved tracks 67 conveniently of angle iron form secured in position by upper brace members 69 connected to the frame 41 and brace members 71 connected to uprights 43. The curved tracks may be also secured by uprights hangers 73 secured to and depending from the floor 19. The sprocket chains may be provided with extensions or rollers 75 adapted to pass along and be supported by the angle bar tracks 67.

The belt in its transit from the lower ends of the tracks 67 to the sprocket wheels 61, may pass along and be supported by tracks 77 on uprights 79 rising from the lower floor 59.

The upper portion of the rotary carrier may be enclosed in a casing 81 apertured to receive the chute 21 referred to. At the top of the casing is an outlet pipe 83 which may be connected to a fan or exhauster for drawing away steam and noxious gases present while the chemical reaction is taking place during the transit of the charges in the pockets as the latter move from a point adjacent the chute 21 downward through the floor 19.

The chute 21 may be provided with a suitable valve or controlling device whereby the operator may deliver the charges into the chute and into the pockets as they progressively pass the lower end thereof. These charges will pass downward as the carrier rotates in a contra-clockwise direction (Fig. 1), and the belt 67 closing the upper ends of the pockets will prevent escape of the charges therefrom until the pockets have traveled, in the present instance, through an arc substantially of 180°. Thereupon, the open ends of the pockets will face downward, and in the course of the rotation of the carrier, the pockets will move upward away from the run of the belt moving over the tracks 77, and the charges will be delivered onto the belt and conveyed away from the carrier.

Figure 3:
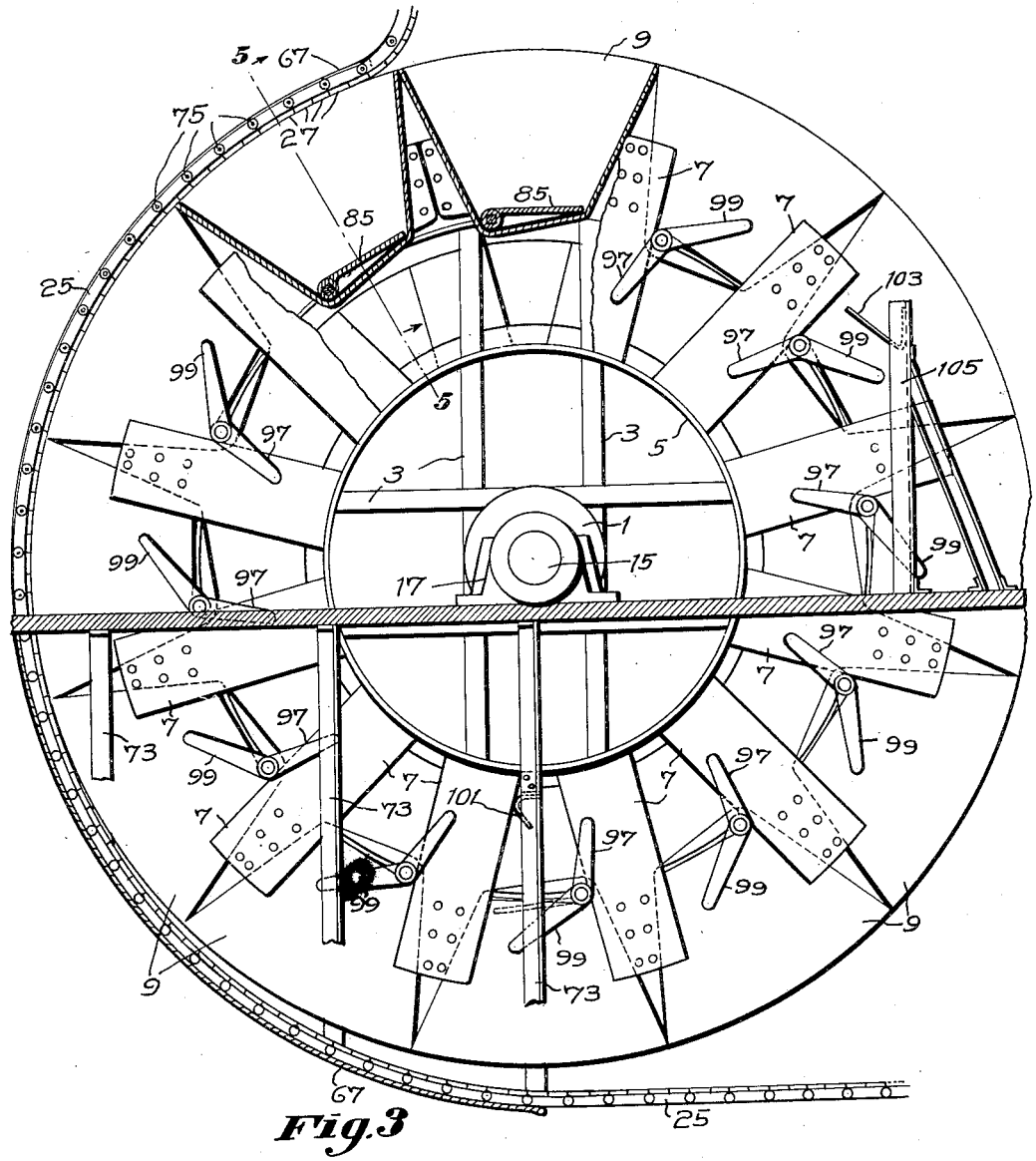
Figure 4:
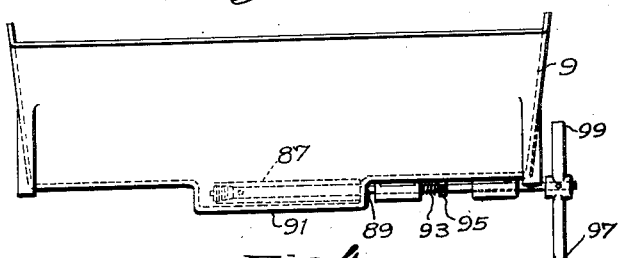
Fig. 4 is a side view of one of the charge receiving pockets.

Preferably the pockets flare outward to facilitate discharge of the charges therefrom. Usually the charges will gravitate out of and clear the same from the pockets without difficulty. To prevent any possibility of the charges sticking in the pockets, suitable means may be provided positively to start or thrust the charges therefrom. To this end, each of the pockets may be provided with an ejector plate 85 having a sleeve 87 (Figs. 3 and 4) fast on a rock shaft 89 journalled in suitable bearings at the bottom of the pocket. The sleeve 87 may be received by a chamber 91, and the shaft 89 may project through an opening in one end of said chamber. To hold an end of the sleeve 87 in frictional engagement with an end of the chamber to prevent leakage, a coil spring 93 may be mounted on the shaft 89 and be confined between an end of one of the bearings and a collar 95 fast on the shaft 89. The construction is such that the spring will press the end of the sleeve 87 into frictional engagement with the end of the chamber and hold the ejector in its positions of adjustment.

At the outer end of the shaft 89 are a pair of arms 97 and 99. The arm 97 is adapted to co-operate with a cam abutment 101 mounted on one of the braces 73 referred to, and the arm 99 is adapted to co-operate with a cam abutment 103 on an upright 105 rising from the floor 19.

The construction is such that as a pocket approaches its lowest position in the course of the rotation of the carrier, the arm 97 will engage the cam abutment 101 and rock the ejector plate down away from the bottom of the pocket and force the charge in the pocket therefrom. As the carrier continues to rotate, the pocket will approach its upper or receiving position, and as it does so, the arm 99 will engage the cam abutment 103 and rock the ejector plate back down against the bottom of the pocket.

As stated, the materials deposited by the rotary carrier on the belt 67 are conveyed by the latter away from the carrier, and the charges will be progressively brought to the sprocket wheels 61.

Here the charges are disintegrated or broken down, and converted into a pulverulent state which liberates steam or moisture therefrom. To accomplish this, in the present instance, a disintegrator may be provided, comprising a hub 107 fast on a shaft 109 journalled in bearings 111 carried by hangers 113 secured to and depending from the floor 19. The hub has arms 115 projecting therefrom secured to rings 117 conveniently of angle bar form. A series of knives 119 are secured to and project from the rings 117, and in the present instance, are of curved form. The shaft 109 may have a pulley 121 fast thereon adapted to be driven by a belt connected to a line shaft or other source of power.

When the disintegrator is rotated, the knives thereof will progressively pick into and break down the solid charges which are progressively advanced by the belt 67 to the disintegrator. This disintegrator not only serves to break down the materials, but also has a fan action which aerates and tends to dry the disintegrated materials.

The materials disintegrated may gravitate downward into a hopper 123 leading to a pan conveyer 125 which may travel in a tunnel or casing and convey the materials to the curing pile, where the chemical action is allowed to continue for a time. Since this pan conveyor may be of usual well known construction, it is unnecessary to show and describe the same in detail herein.

The materials delivered through the chute 21 into the pockets are carried by the pockets from the upper point of their orbit to the lower point of their orbit. Thus, the pockets at one side of the rotary conveyor will contain charges, while the pockets at the opposite side of the carrier will be empty. Therefore, the weight of the materials tends to rotate the carrier in a fashion somewhat similar to a water wheel. The frictional effect of the belt on the wheel will be sufficient to check or retard the speed of rotation of the wheel, and regulate the speed so that the pockets in moving from charge receiving to charge delivering positions, will have sufficient travel to enable the materials to change from sludge to solid form.

The operation of the apparatus will be readily understood from the foregoing description without further explanation.

It will be understood that the invention is not limited to the specific embodiment shown, and that various deviations may be made therefrom without departing from the spirit and scope of the appended claims:—

1. An apparatus for manufacturing acid phosphate, comprising, in combination, means having a series of pockets for receiving and conveying charges of mixed ground phosphate rock and acid, and means to disintegrate the charges after delivery from said pockets.

2. An apparatus for manufacturing acid phosphate, comprising, in combination, a series of containers for receiving a semi-liquid mixture of ground phosphate rock and acid, means for advancing the containers continuously with a sufficient length of travel to allow the mixture to solidify during transit, and means for discharging the solidified mixture from the container during transit.

3. An apparatus for manufacturing acid phosphate comprising, in combination, a series of containers for receiving a semi-liquid mixture of ground phosphate rock and acid, means for advancing the containers continuously with a sufficient length of travel to allow the mixture to solidify during transit, means for discharging the solidified mixture from the containers during transit, and means for breaking up the solid mixture and aerating the materials as they are broken up.

4. An apparatus for manufacturing acid phosphate, comprising, in combination, a continuously traveling carrier, means for delivering a semi-liquid mixture of ground phosphate rock and acid to the carrier as the latter passes a predetermined point, means for delivering the mixture from the carrier as the latter passes a second predetermined point, means for advancing the carrier at a speed to allow the mixture to solidify during transit between said points, and means for breaking up the solid mixture.

5. An apparatus for manufacturing acid phosphate, comprising, in combination, a rotary carrier having pockets for receiving charges of mixed ground phosphate rock and acid, and means to disintegrate the charges.

6. An apparatus for manufacturing acid phosphate, comprising, in combination, a rotary carrier having a series of pockets, means to deliver charges of ground phosphate rock and acid into said pockets when the latter are at the higher point of their rotary path, a disintegrator, and means to receive the charges from said pockets when the latter are in the lower point of their path, and to convey the same to the disintegrator, that they may be broken up by the latter.

7. An apparatus for manufacturing acid phosphate, comprising, in combination, a rotary carrier having pockets for receiving charges of ground phosphate rock and acid, means to deliver the charges into the pockets when passing through the upper portion of their orbit, a belt wrapped partially about the carrier for holding the charges in the pockets while moving from receiving to discharging positions, and means to disintegrate the charges.

8. An apparatus for manufacturing acid phosphate, comprising, in combination, a rotary carrier having pockets for receiving charges of mixed ground phosphate rock and acid, a disintegrator and a belt co-operating with said carrier to hold the charges therein while the pockets are moving from receiving to discharging position, said belt being adapted to convey the charges from the rotary carrier to the disintegrator, that they may be broken up by the latter.

9. An apparatus for manufacturing acid phosphate, comprising, in combination, a rotary carrier having pockets therein movable to charge receiving and charge delivering positions, a belt partially wrapping about the rotary carrier to hold the charges in said pockets when moving from receiving to delivery positions, and a disintegrator adjacent said belt for breaking up the charges delivered from the rotary carrier onto said belt.

10. An apparatus for manufacturing acid phosphate, comprising, in combination, a rotary carrier having pockets movable from charge receiving to charge delivery positions, a disintegrator, and a belt for holding the charges in said pockets while traveling from receiving to delivering positions and adapted to receive the delivered charges and convey the same to the disintegrator.

11. An apparatus for manufacturing acid phosphate, comprising, in combination, a rotary carrier having charge receiving pockets therein, a disintegrator, a belt partially wrapping about said carrier to hold the charges therein, and curved tracks for holding the belt up to the pockets.

12. An apparatus for manufacturing acid phosphate, comprising, in combination, a rotary carrier having charge receiving pockets therein, upper wheels, lower wheels, and an endless belt guided by said wheels and partially wrapping about the rotary carrier to hold the charges in said pockets on rotation through a portion of their orbit and to receive the charges and convey the same from said carrier.

13. An apparatus for manufacturing acid phosphate, comprising, in combination, a rotary carrier having charge receiving pockets, means to deliver charges into said pockets when traveling through the upper part of their orbit, means to receive the charges from the pockets when traveling through the lower part of their orbit, and means to eject the charges from said pockets.

14. An apparatus for manufacturing acid phosphate, comprising, in combination, a rotary carrier having flaring pockets for receiving charges of mixed ground phosphate rock and acid, and a belt partially wrapping about the carrier to hold the charges in said pockets until the mixture has solidified, said belt being adapted to receive the solidified charges from the pockets and convey the same from the carrier.

15. An apparatus for manufacturing acid phosphate, comprising, in combination, a rotary carrier having pockets for receiving charges of mixed ground phosphate rock and acid, a belt partially wrapping about the carrier to hold the charges in the pockets while the latter are moving from receiving to discharge positions, and ejectors for said pockets having arms and abutments co-operating with said arms to move said ejectors to discharging and receiving positions in the course of travel of the pockets through their orbit.

16. An apparatus for manufacturing acid phosphate, comprising, in combination, a carrier having pockets for receiving charges of mixed ground phosphate rock and acid, means to deliver the charges into said pockets when moving through the upper part of their orbit, means to receive the charges from the pockets when moving through the lower part of their orbit, and means adjacent the receiving means for disintegrating and aerating the charges.

17. An apparatus for manufacturing acid phosphate, comprising, in combination, a carrier having pockets for receiving charges of mixed ground phosphate rock and acid, means to deliver the charges into said pockets when moving through the upper part of their orbit, means to receive the charges from the pockets when moving through the lower part of their orbit, means adjacent the receiving means for disintegrating and aerating the charges, and means to receive the disintegrated materials and conveying the same to a curing pile.

In testimony whereof, I have signed my name to this specification.

THOMAS J. STURTEVANT.